United States Patent [19]
Liljedahl

[11] Patent Number: 6,142,214
[45] Date of Patent: Nov. 7, 2000

[54] METHOD FOR ALTERING THE TEMPERATURE OF A PREMISES AND DEVICE FOR CARRYING OUT SAID METHOD

[76] Inventor: Hans Arne Bertil Liljedahl, Planvägen, Lund, Sweden, S-226 47

[21] Appl. No.: 09/043,118

[22] PCT Filed: Sep. 17, 1996

[86] PCT No.: PCT/SE96/01151

§ 371 Date: Mar. 18, 1998

§ 102(e) Date: Mar. 18, 1998

[87] PCT Pub. No.: WO97/11315

PCT Pub. Date: Mar. 27, 1997

[30] Foreign Application Priority Data

Sep. 18, 1995 [SE] Sweden ................................. 9503222

[51] Int. Cl.⁷ ........................................................ F28D 3/00
[52] U.S. Cl. ............................ 165/45; 165/47; 165/53
[58] Field of Search .................................. 165/45, 47, 53

[56] References Cited

U.S. PATENT DOCUMENTS

| | | | |
|---|---|---|---|
| 2,784,945 | 3/1957 | Fodor | 165/45 |
| 3,782,132 | 1/1974 | Lohoff | 165/45 |
| 4,299,270 | 11/1981 | McGrath . | |
| 4,779,673 | 10/1988 | Chiles et al. | 165/45 |
| 4,790,478 | 12/1988 | Sauvageau | 165/45 |
| 5,069,199 | 12/1991 | Messner | 165/45 |
| 5,178,485 | 1/1993 | Katsuragi et al. | 165/45 |
| 5,233,971 | 8/1993 | Hanley | 165/45 |
| 5,368,092 | 11/1994 | Rearden et al. | 165/45 |
| 5,584,190 | 12/1996 | Cole | 165/45 |
| 5,634,515 | 6/1997 | Lambert | 165/45 |
| 5,738,164 | 4/1998 | Hildebrand | 165/45 |
| 5,742,001 | 4/1998 | Thuries | 165/45 |
| 5,816,063 | 10/1998 | Schulak et al. | 165/45 |

FOREIGN PATENT DOCUMENTS

| | | |
|---|---|---|
| 2218716 C2 | 11/1983 | Germany . |
| 351 716 | 4/1971 | Sweden . |
| 467 173 | 6/1992 | Sweden . |
| 642 752 A5 | 8/1981 | Switzerland . |
| 642 737 A5 | 4/1984 | Switzerland . |
| WO 84/01794 | 5/1984 | WIPO . |

*Primary Examiner*—Ira S. Lazarus
*Assistant Examiner*—Terrell McKinnon
*Attorney, Agent, or Firm*—Bacon & Thomas, PLLC

[57] ABSTRACT

A method and device for altering the temperature of a premises, wherein a medium in the summertime is cooled by the cool night air and is brought into a floor layer directly under the premises for cooling the premises during the day. In order to minimize the risk of migration of moisture from the ground and upwards to the floor layer, the floor layer and an underlying foundation are cooled so that at least an upper portion of the floor layer reaches a minimum temperature which substantially exceeds the temperature of the ground under the foundation.

25 Claims, 2 Drawing Sheets

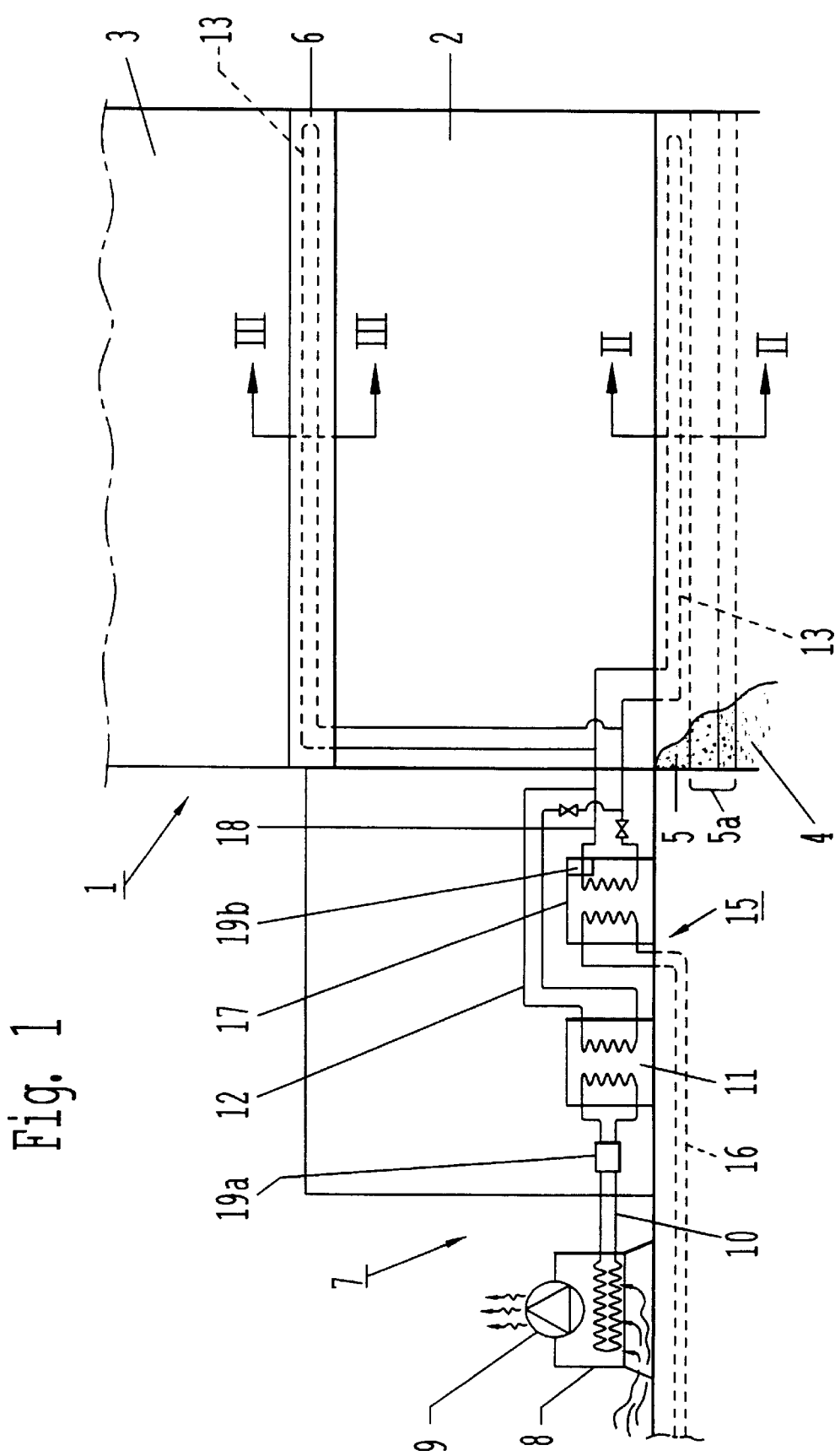

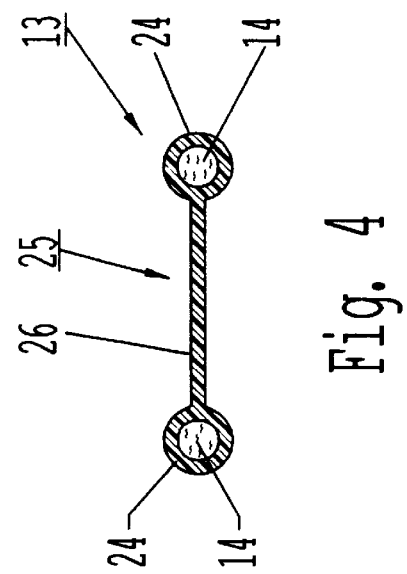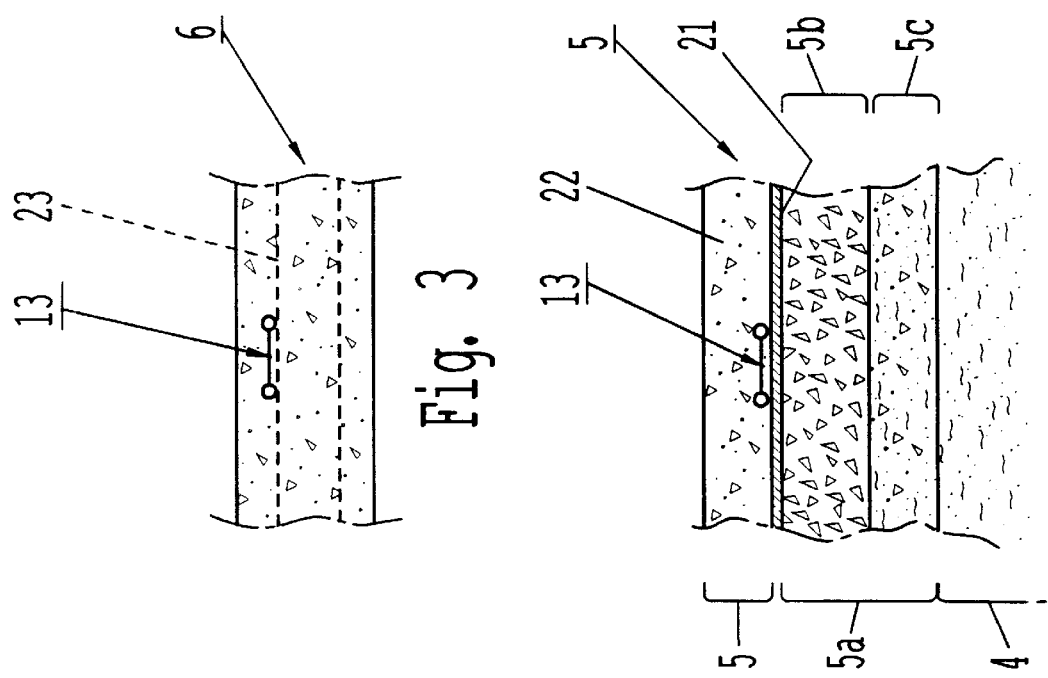

METHOD FOR ALTERING THE TEMPERATURE OF A PREMISES AND DEVICE FOR CARRYING OUT SAID METHOD

BACKGROUND OF THE INVENTION

1. Field of the Invention

The present invention relates to a method for altering the temperature of a premises, whereby a medium in the summertime is cooled during the night by cool night air and is brought into a floor layer under a floor of the premises to cool said premises during the day. The invention also relates to a device for carrying out this method.

2. Description of the Related Art

According to SE public specification 351 716 it is already known to utilize the floor layer in a building as an accumulator for cold. This accumulator is cooled during the night in the summer and used to cool the premises in the daytime. However, there is a risk that cooling of said accumulator causes an undesired migration of moisture from the ground and upwards through the floor layer.

SUMMARY OF THE INVENTION

The object of the present invention has been to provide a simple method and a simple device which remedies this shortcoming.

Thanks to the method and device according to the invention, undesired migration of moisture from the ground and upwards through the floor layer is prevented.

BRIEF DESCRIPTION OF THE DRAWINGS

The invention will be further described below with reference to the accompanying drawings, in which:

FIG. 1 schematically illustrates a device for carrying through the method according to the invention;

FIG. 2 is a section view II—II through the device of FIG. 1;

FIG. 3 is a section view III—III through the device of FIG. 1; and

FIG. 4 is a section through a conduit system forming part of the device according to the invention.

DETAILED DESCRIPTION OF THE PREFERRED EMBODIMENTS

In FIG. 1 there is illustrated a building 1, e.g. a school building with premises 2 and 3, e.g. school premises. The building 1 has a floor layer 5 which is located on a bed/foundation 5a placed on a section of ground 4 under the building 1. The foundation 5a consists of an upper layer 5b of stone material, e.g. macadam, and a lower layer 5c of another stone and/or gravel material. The foundation 5a preferably has a depth of about 30 cm, whereby the upper layer 5b is about 20 cm and the lower layer 5c about 10 cm. Between the premises 2 and 3 there is an intermediate floor structure 6.

In order to cool the floor layer 5 and the intermediate floor structure 6 during the summer, there is provided a cooling device 7 comprising a refrigerating machine 8 located outdoors. The refrigerating machine 8 includes a fan device 9 and a coolant system 10 with a coolant which preferably contains an anti-freeze agent, e.g. glycol, for protecting the coolant system 10 from bursting by the frost in the winter. The coolant system 10 cooperates with a first heat exchanger 11 and a tube system 12 also cooperates with said first heat exchanger 11, said tube system 12 being connected for communication with a conduit system 13 which is located in the floor layer 5 and/or the foundation 5a and in the intermediate floor structure 6. The conduit system is free from freon and includes no compressor.

The object of said cooling device 7 is in the summer, during the night, to transport by the fan device 9, cool night air through the refrigerating machine 8 for cooling the coolant in the coolant system 10 by heat exchange with the cooler night air. The chilled coolant is fed through the coolant system 10 to the first heat exchanger 11 and cools therein, the liquid 14 located in the tube system 12 and the conduit system 13 and consisting preferably of water or a mixture of substantially water.

For being able to chill the premises in the summertime for an entire working day, i.e. up to about 8 hours, with full desired capacity, the chilled liquid 14 is during the night brought to cool not only the floor layer 5 but also the foundation 5a until said crawl space 5 as well as said foundation 5a have been sufficiently large to cool the premises 2 as the floor layer 5 as well as the foundation 5a is sufficiently large to cool the premises 2 as mentioned, i.e. up to about 8 hours.

The liquid 14 is brought to cool the foundation 5a to a depth of at least about 20 cm, preferably about 30 cm, whereby the upper layer 5b has been cooled in its full depth and the lower layer 5c at least in the major part of its depth.

Additionally, the floor layer 5 as well as the foundation 5a is cooled in their full or substantially full lengths and widths.

The liquid 14 may be brought to cool the floor layer 5 in a direction from below and upwards and simultaneously, the foundation 5a in a direction from above and downwards. Preferably, the liquid 14 can be fed through lower portions of the crawl space 5 located adjacent the underlying foundation 5a, as well as through the intermediate floor structure 6 (as shown in FIGS. 1 and 3) and thus, the premises 3, are also chilled or cooled during the night.

In order to heat the floor layer 5 and eventually the foundation 5a as well as the intermediate floor structure 6 during the winter, there is provided a heating device 15 comprising a heating system 16, e.g. a district heating system or eventually a heating boiler, which cooperates with a second heat exchanger 17. A tube system 18 also cooperates with the second heat exchanger 17 and said tube system 18 is further connected for communication with the conduit system 13.

The object of said heating device 15 is, in the winter, to transfer heat in the second heat exchanger 17 from the heating system 16 to the liquid 14 in the conduit system 13 for heating the floor layer 5 and the intermediate floor structure 6 and thus, the air in the premises 2 and 3.

In order to effectively ensure that no migration of moisture occurs from the ground 4 up through the floor layer 5, said floor layer and the foundation 5a are cooled so that at least upper parts of said floor layer 5 reach a minimum temperature which substantially exceeds the temperature in the ground 4. This can be carried through in may ways, e.g. by dimensioning or designing the members in question therefor, or by adapting the flow of liquid in question therefor and/or by providing at control device 19a therefor in the cooling device 7 or in another suitable location.

Since the average temperature in the ground 4 over a year is about 8° C., the ground temperature is somewhat lower in the winter and somewhat higher in the summer. For prevention said migration of moisture in the summer, the floor layer 5 and the foundation 5a are preferably cooled to a minimum temperature not lower than about 16° C., and in the winter said floor over floor layer 5 is heated to a temperature which is substantially higher, preferably about 25–26° C. Determination of the minimum temperature in the floor over crawl space 5 in the winter can also be carried through in different ways, e.g. by a control device 19b.

The conduit system 13 is preferably located on top of the foundation 5a, e.g. on the upper layer 5b or preferably on an optional separating layer 21, e.g. a fiber cloth, which is placed on said upper layer 5b. When the conduit system 13 is located in this way, a casting layer 22, e.g. of concrete material, is cast on top of the foundation 5a or preferably on top of the separating layer 21 and the conduit system 13, so that cooling occurs in a direction upwards through the floor layer 5 and at the same time in downwards direction through the foundation 5a.

In the intermediate floor structure 6, the conduit system 13 is preferably located on a reinforcing device 23, e.g. a steel fabric, which is provided in the upper portion of the intermediate floor structure 6 or substantially therein. Hereby, the conduit system 13 will also be located in e.g. an upper third of the intermediate floor structure 6. Preferably, the conduit system 13 is placed or mounted on the reinforcing device 23 before the intermediate floor structure 6 is cast and then, concrete material is filled into the mould for finishing said intermediate floor structure 6.

The conduit system 13 preferably comprises at least one flexible hose 24 of such rubber material or such corresponding material that the liquid 14 can not come in contact with surrounding material in the floor layer 5 and the foundation 5a or in the intermediate floor structure 6. The hose 24 can be bent manually to a suitable shape so that it runs in the floor layer 5 and the intermediate floor structure 6 as loops in a conduit without joints. In the embodiment shown, the conduit system 13 comprises elongated double-hose units 25, which may be bent manually and which includes two hoses 24 which run in parallel with each other and are connected to each other through manually bendable connecting members 26 of the same material as the hoses 24.

Eventual excessive heat obtained during said method may be used for heating air which is blown into the premises by a fan device (not shown).

The method and device described above may vary within the scope of the subsequent claims. Thus, the foundation 5a may consist of another material and one or more layers placed on the ground. As an example of an alternative foundation, one should mention a natural rock base or the like. It is also possible in certain cases to use another medium other than liquid 14 for cooling/heating of the floor layer 5 and the foundation 5a as well as eventually, the intermediate floor structure 6, there may be more than one intermediate floor structure 6 which is cooled/heated if the building has many stories and the conduit system 13 may be of another type than a flexible hose or several hoses. Furthermore, it is also possible to feed said medium 14 through the floor layer 5 as well as the foundation 5a or eventually only through said foundation 5a. It is also possible in certain cases, besides the floor layer 5 and the foundation 5a, to cool the underlying ground 4.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A method for altering the temperature of a premises having a bed/foundation of stone/gravel material over a section of ground, a floor above the bed/foundation and a floor layer located between the bed/foundation and the floor, the method comprising the steps of:

cooling a medium during the night in the summertime by heat exchange with cooler night air;

circulating the cooled medium into a floor layer under a floor of a premises to cool the premises during the day; and establishing a temperature difference between at least an upper portion of the floor layer and a ground under a bed/foundation located under the floor layer by carrying out said step of circulating the cooled medium in the floor layer in such a manner so as to cool the floor layer and the bed/foundation so that a lowest temperature of at least the upper portion of the floor layer substantially exceeds the temperature of the section of ground, the temperature difference preventing an undesired migration of moisture through the floor layer from the section of ground.

2. The method according to claim 1, wherein the medium is circulated in the floor layer to cool the floor layer and the bed/foundation so that at least the upper portion of the floor layer is about 16° C.

3. The method according to claim 1, further comprising the steps of:

heating the medium in the winter by a heating device; and circulating the heated medium into the floor layer to heat the floor layer and the bed/foundation.

4. The method according to claim 3, wherein the heated medium is circulated in the floor layer to heat at least the upper portion of the floor layer to a temperature of about 25–26° C.

5. The method according to claim 1, wherein the medium is circulated in the floor layer to cool the bed/foundation to a depth of at least about 20 cm.

6. The method according to claim 1, further comprising the steps of:

cooling an upper layer of the bed/foundation via the cooled medium until the upper layer is cooled throughout its entire depth; and cooling a lower layer of the bed/foundation via the cooled medium until at least the majority of its depth has been cooled.

7. The method according to claim 1, further comprising the steps of:

cooling at least the majority of the depth of the bed/foundation via the cooled medium; and cooling a portion of the section of ground via the cooled medium.

8. The method according to claim 1, wherein the cooled medium is circulated in the floor layer to cool the floor layer in an upward direction and to simultaneously cool the bed/foundation in a downward direction.

9. The method according to claim 1, wherein the medium is circulated in the floor layer by feeding the medium through a lower portion of the floor layer adjacent the bed/foundation.

10. The method according to claim 1, wherein the medium is a liquid and is circulated in the floor layer by feeding the medium through a conduit system which extends into the floor layer and without using a compressor and freon.

11. The method according to claim 1, further comprising the step of:

feeding the medium through the bed/foundation via a conduit system which extends into the bed/foundation and without using a compressor and freon.

12. The method according to claim 1, further comprising the step of:

feeding the cooled medium through at least one intermediate floor structure in the premises to cool a section of the premises above the intermediate floor structure.

13. The method according to claim 12, wherein said medium is fed through the intermediate floor structure via a conduit system which extends into the intermediate floor structure.

14. A method for cooling a premises having a bed/foundation of stone/gravel material, a floor above the bed/foundation, a floor layer located between the bed/foundation and the floor and a conduit system located on top of the bed/foundation, the method comprising the steps of:

cooling a medium during the night in the summertime by heat exchange with cooler night air;

circulating the cooled medium into a floor layer under a floor of a premises to cool the premises during the day;

circulating the cooled medium through a conduit system on top of a bed/foundation located under the floor layer to cool the bed/foundation; and establishing a temperature difference between an upper portion of the floor layer and a ground under the bed/foundation during the step of circulating the cooled medium in the floor layer by cooling the floor layer and the bed/foundation so that the temperature of the upper portion of the floor layer exceeds the temperature of the ground below it sufficiently to minimize upward migration of moisture from the ground to the floor layer.

15. An apparatus for altering the temperature of a premises, comprising:

a bed/foundation of stone/gravel material located above a section of ground;

a floor of a premises to be cooled located above said bed/foundation;

a floor layer located between said bed/foundation and said floor;

a cooling device arranged to cool a medium by heat exchange with cooler night air during the night in the summertime for use in said floor layer for cooling said premises during the day and for cooling said bed/foundation such that said floor layer and said bed/foundation may be cooled to a minimum temperature which substantially exceeds the temperature of said section of ground so that an undesired upward migration of moisture from said section of ground through said floor layer is prevented.

16. An apparatus according to claim 15, further comprising:

a heating device for heating said medium during the winter for use in warming said floor layer and bed/foundation.

17. An apparatus according to claim 16, wherein in the summertime said cooling device is arranged to cool said medium to cool said floor layer and said bed/foundation to a minimum temperature of about 16° C. and wherein in the winter said heating device is arranged to heat said medium to warm said floor layer and said bed/foundation to a minimum temperature of about 25–26° C.

18. An apparatus according to claim 16, wherein said cooling device comprises a coolant system including a refrigeration machine outside said floor layer which cools a coolant in said coolant system, a conduit system containing said medium at least located in said floor layer and a first heat exchanger which transfers heat to said coolant system from said medium in said conduit system; and wherein said heating device comprises a heating system including said conduit system and a second heat exchanger which transfers heat from said heating system to said medium in said conduit system.

19. An apparatus according to claim 18, wherein said conduit system forms part of a system excluding freons or compressors.

20. An apparatus according to claim 18, wherein said floor layer includes a lower portion adjacent said bed/foundation through which said medium is fed via said conduit system.

21. An apparatus according to claim 18, further comprising:

an intermediate floor structure between said premises and a second premises;

a reinforcing device which forms part of said intermediate floor structure; and a second conduit system in said intermediate floor structure located in substantially an upper third of said intermediate floor structure on said reinforcing device.

22. An apparatus according to claim 18, wherein said conduit system comprises at least one flexible hose which is bent into conduit loops and mounted in said floor layer without joints.

23. An apparatus according to claim 18, wherein said conduit system comprises a plurality of double-hose units which are manually bendable and include two parallel hoses and a plurality of manual bendable connecting members of the same material as said hoses which connect said hoses to each other.

24. An apparatus for cooling a premises, comprising:

a bed/foundation of stone/gravel material;

a floor of a premises to be cooled located above said bed/foundation;

a floor layer formed on top of said bed/foundation and below said floor;

a conduit system containing a medium located on top of said bed/foundation; and a cooling device arranged to cool said medium during the night in the summertime by heat exchange with cooler night air, said cooled medium being supplied to said floor layer for cooling said premises during the day and for cooling said bed/foundation, such that the temperature of an upper portion of the floor layer substantially exceeds the temperature of a ground below the bed/foundation to minimize upward migration of moisture from the ground to the floor layer.

25. An apparatus according to claim 24, further comprising:

a separating layer located on said bed/foundation and on which said conduit system is located; and wherein said floor layer is disposed on top of said conduit system and said separating layer.

* * * * *